United States Patent [19]

Glider et al.

[11] Patent Number: 5,361,347

[45] Date of Patent: * Nov. 1, 1994

[54] RESOURCE MANAGEMENT IN A MULTIPLE RESOURCE SYSTEM WHERE EACH RESOURCE INCLUDES AN AVAILABILITY STATE STORED IN A MEMORY OF THE RESOURCE

[75] Inventors: Joseph S. Glider, Palo Alto; David H. Jaffe, Belmont, both of Calif.

[73] Assignee: MTI Technology Corporation, Sunnyvale, Calif.

[ * ] Notice: The portion of the term of this patent subsequent to May 25, 2010 has been disclaimed.

[21] Appl. No.: 965,135

[22] Filed: Oct. 22, 1992

Related U.S. Application Data

[63] Continuation of Ser. No. 505,854, Apr. 6, 1990, Pat. No. 5,214,778.

[51] Int. Cl.$^5$ .................. G06F 11/00; G06F 13/00
[52] U.S. Cl. ..................... 395/575; 371/29.1;
371/18; 364/DIG. 1; 364/267; 364/267.2;
364/267.7; 364/268; 364/269.2; 364/264;
364/264.6
[58] Field of Search ............... 395/575, 500, 650, 725;
371/15.1, 16.1, 16.5, 18, 11.1, 11.3, 29.1

[56] References Cited

U.S. PATENT DOCUMENTS

| | | |
|---|---|---|
| 3,303,482 | 2/1967 | Jenkins . |
| 3,544,777 | 12/1970 | Winkler ................. 365/201 X |
| 3,693,159 | 9/1972 | Hilberg ................. 395/425 |
| 3,772,652 | 11/1973 | Hilberg ................. 395/425 |
| 3,803,560 | 4/1974 | DeVoy et al. ............ 395/575 |
| 3,806,878 | 4/1974 | Edstrom ................. 395/275 |
| 3,812,468 | 5/1974 | Wollum et al. .......... 371/11.3 X |
| 3,838,260 | 9/1974 | Nelson ................. 371/16.5 X |
| 3,905,023 | 9/1975 | Perpiglia .............. 395/575 |
| 3,917,933 | 1/1975 | Scheuneman et al. ..... 371/10.2 |
| 4,070,704 | 1/1978 | Calle et al. ........... 395/700 |
| 4,093,985 | 6/1978 | Das .................... 395/575 |
| 4,207,609 | 6/1980 | Luiz et al. ............ 395/325 |

(List continued on next page.)

FOREIGN PATENT DOCUMENTS

| | | |
|---|---|---|
| 0266789 | 11/1986 | European Pat. Off. . |
| 0369707 | 6/1990 | European Pat. Off. . |
| 56-88549 | 7/1981 | Japan . |
| 56-94593 | 7/1981 | Japan . |
| 56-163596 | 12/1981 | Japan . |
| 57169297 | 12/1981 | Japan . |
| 57-111890 | 7/1982 | Japan . |
| 57-111893 | 7/1982 | Japan . |
| 57-195397 | 12/1982 | Japan . |
| 58-83400 | 5/1983 | Japan . |
| 60-156152 | 8/1985 | Japan . |
| 61-99999 | 5/1986 | Japan . |
| 1233087 | 7/1967 | United Kingdom . |
| 1497680 | 12/1967 | United Kingdom . |

OTHER PUBLICATIONS

Freeman, Donald E., et al., "I/O Design—Data Management in Operating Systems," Hayden Book Co., Inc., 1977, Chpts. 6 and 9, pp. 107–124; 176–196.

(List continued on next page.)

*Primary Examiner*—Paul V. Kulik
*Attorney, Agent, or Firm*—Townsend and Townsend Khourie and Crew

[57] ABSTRACT

A computing system providing resource management in a multiple resource system. In the preferred embodiment, the computing system has a plurality of resources for storing, transmitting or manipulating data. The system also has a fault management subsystem that accesses and operates the resources when the resources are in a first availability state and an operational subsystem for accessing and operating the resources when the resources are in a second availability state. The system has a mechanism for providing real time sharing of any of the resources between the fault management subsystem and the operational subsystem without disrupting the services provided by the operational subsystem. In addition, the system has a mechanism for representing the operational interdependencies of the resources by organizing the resources in a logical structure in which each resource is a node conceptually connected to at least one other resource.

10 Claims, 8 Drawing Sheets

U.S. PATENT DOCUMENTS

| | | | |
|---|---|---|---|
| 4,339,804 | 7/1982 | Davison et al. | 395/425 |
| 4,342,079 | 7/1982 | Stewart et al. | 395/425 |
| 4,464,747 | 8/1984 | Groudan et al. | 371/50.1 |
| 4,467,421 | 8/1984 | White | 395/425 |
| 4,468,731 | 8/1984 | Johnson et al. | 395/575 |
| 4,507,730 | 3/1985 | Johnson et al. | 395/425 |
| 4,587,609 | 5/1986 | Boudreau et al. | 395/725 |
| 4,667,326 | 5/1987 | Young et al. | 371/39.1 |
| 4,722,085 | 1/1988 | Flora et al. | 371/40.1 |
| 4,727,487 | 2/1988 | Masui et al. | 395/67 |
| 4,761,785 | 8/1988 | Clark et al. | 371/2.2 |
| 4,768,193 | 8/1988 | Takamae | 371/10.3 |
| 4,789,985 | 12/1988 | Akahoshi et al. | 371/11.3 |
| 4,814,982 | 3/1989 | Weir | 395/275 |
| 4,817,035 | 3/1989 | Timsit | 395/425 |
| 4,825,403 | 4/1989 | Gershenson et al. | 360/52 |
| 4,849,929 | 7/1989 | Timsit | 395/575 |
| 4,914,656 | 4/1990 | Dunphy et al. | 371/10.2 |
| 4,979,055 | 12/1990 | Squires et al. | 360/69 |
| 4,980,818 | 12/1990 | Shinmurd | 360/98.05 X |
| 5,115,499 | 5/1992 | Stiffler et al. | 395/425 |
| 5,214,778 | 5/1993 | Glider et al. | 395/575 |

OTHER PUBLICATIONS

Blum, "Fast Access Disk File with Several Parallel Heads," IBM Technical Disclosure Bulletin, vol. 25, No. 6, Nov. 1982.

W. Jilke, "Disk Array Mass Storage Systems: The New Opportunity," Amperif Corporation, Sep. 30, 1986.

W. Jilke, "Economics Study of Disk Array Mass Storage Systems: The Cost Reduction Opportunity," Amperif Corporation, Mar. 24, 1987.

Kim, Michelle Y., "Synchronized Disk Interleaving," IEEE Transactions on Computers, vol. C-35, No. 11, Nov. 1986.

Lieberman, D., "SCSI-2 Controller Board Builds Parallel Disk Drive Arrays," *Computer Design*, vol. 28 No. 2, Apr. 1, 1989, pp. 32, 36.

Meador, W., "Disk Array Systems," Spring COMPCON '89 Digest of Papers, IEEE Computer Society Press, pp. 143–146.

Olson, T., "Disk Array Performance in an Random I/O Environment," *Computer Architecture*, vol. 17 No. 5, Sep. 1989, pp. 71–77.

Product Description, Micropotis 1804 SCSI Parallel Drive Array, Document No. 108120 Rev. A.

Program Summary, DataStorage '86, An International Forum, Sep. 22–24, 1986, Red Lion Inn, San Jose, Calif.

Sierra, H., "Assessing the Promise of Disk Arrays," Canadian Datasystems, May 1989, pp. 52–53.

Simpson, D., "RAIDS vs. SLEDS," Systems Integration, Nov. 1989, pp. 70–82.

Sisley, Mike, "Microprogram Development Technique Adds Flexibility," *New Electronics*, vol. 17, No. 23, Nov. 27, 1984, pp. 35–38.

Voelker, J., "Winchester Disks Reach for a Gigabyte," *IEEE Spectrum*, Feb. 1987, pp. 64–67.

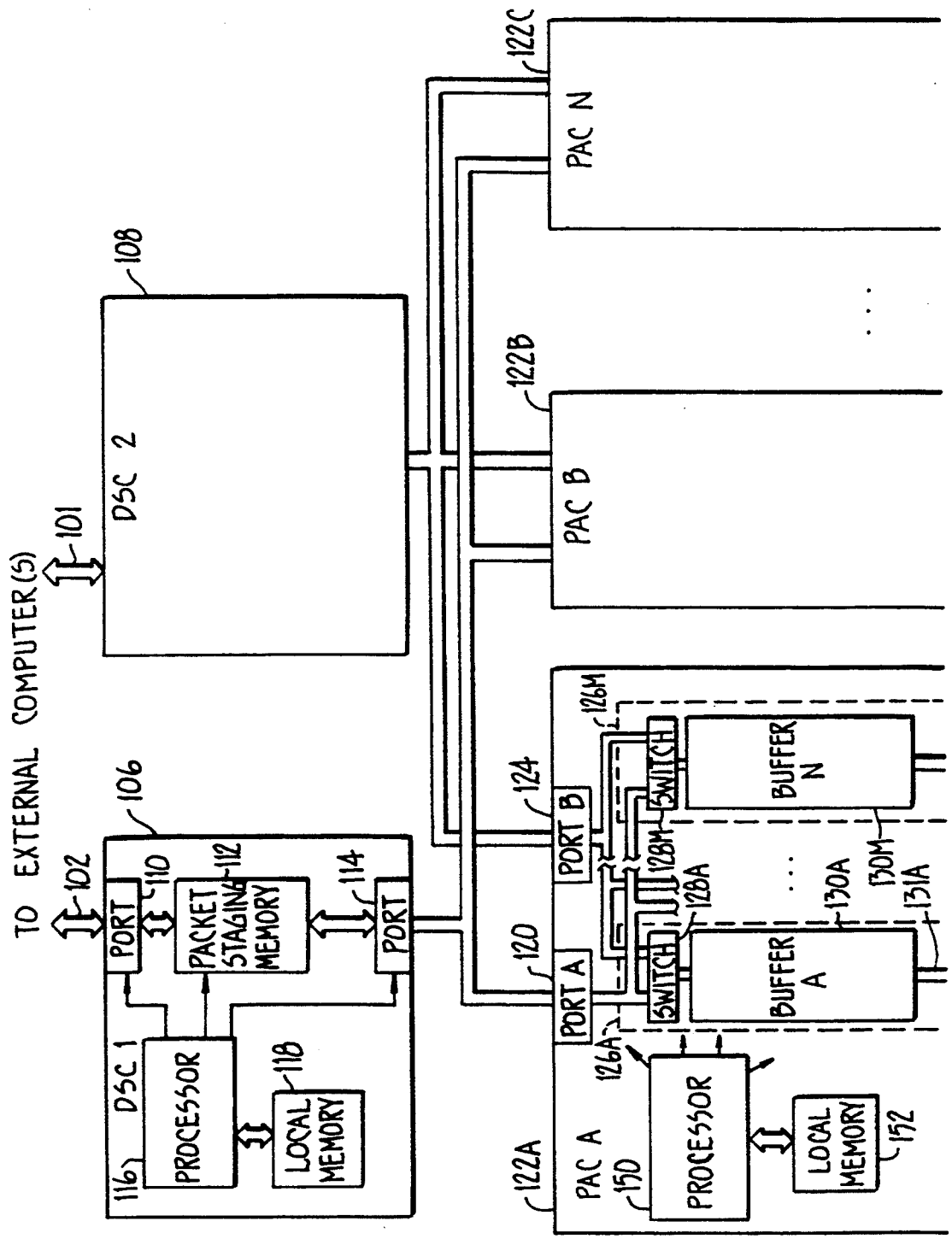
FIG._1A.
FIG._1.
| Fig. 1A. |
| Fig. 1B. |

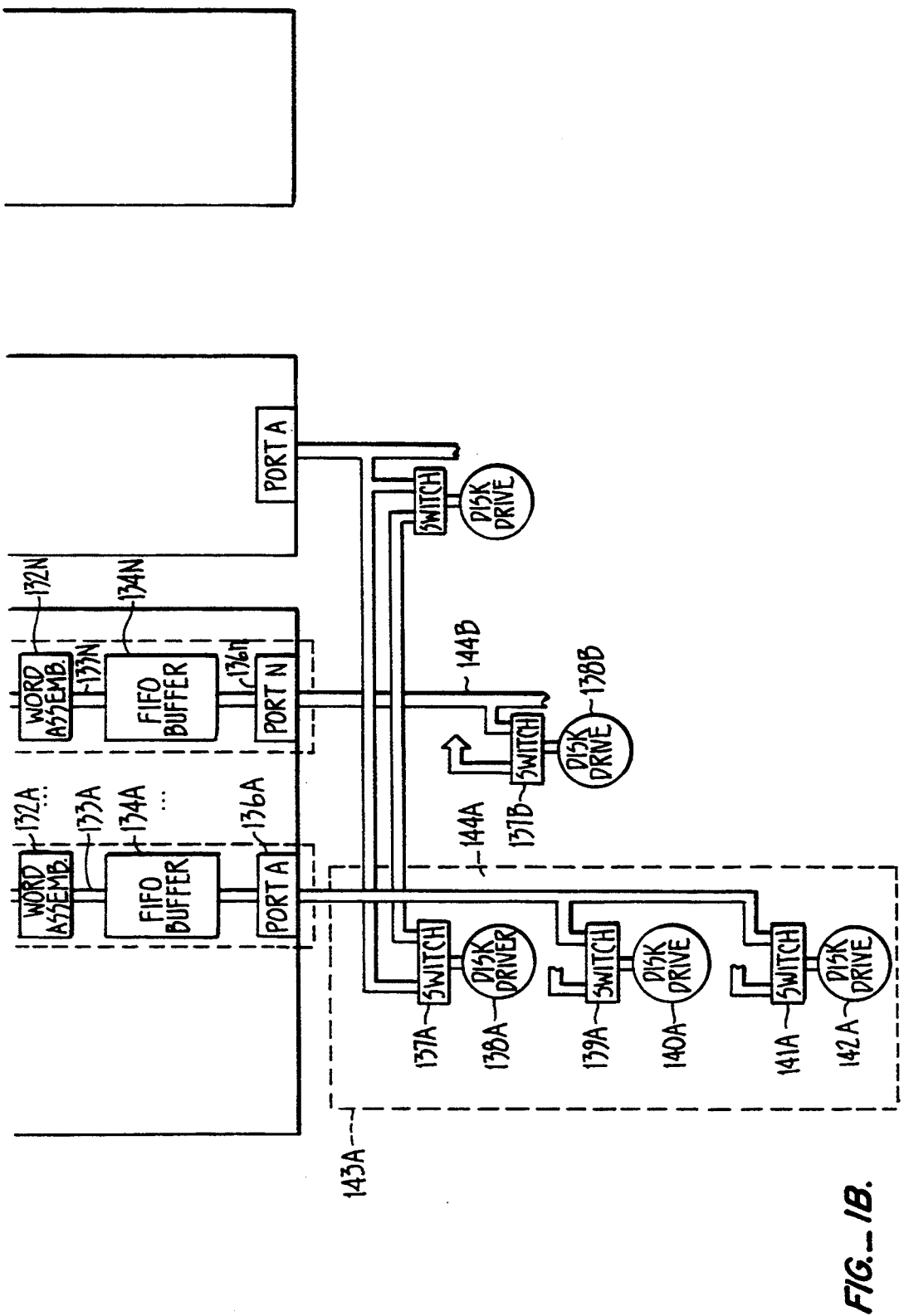
FIG._1B.

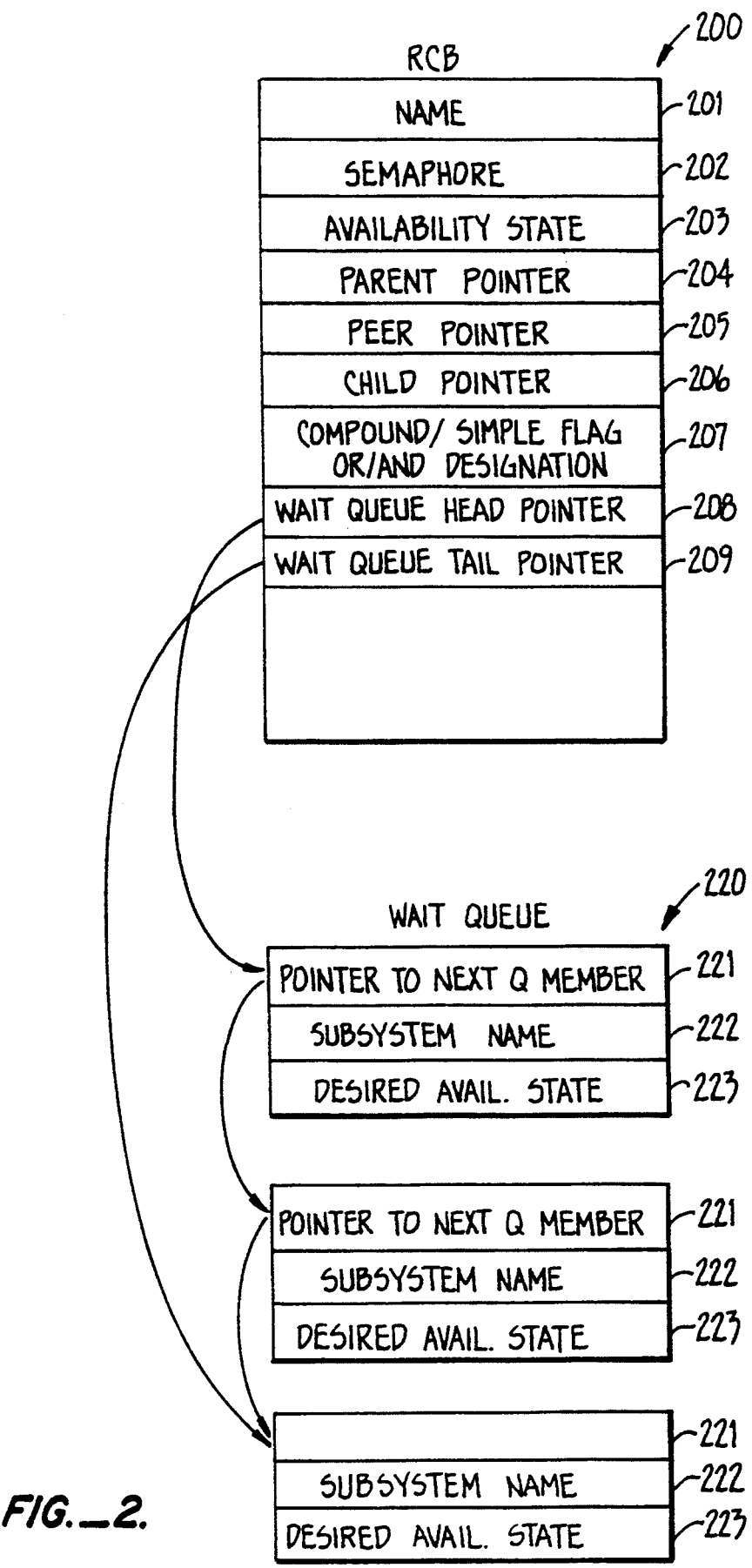
FIG._2.

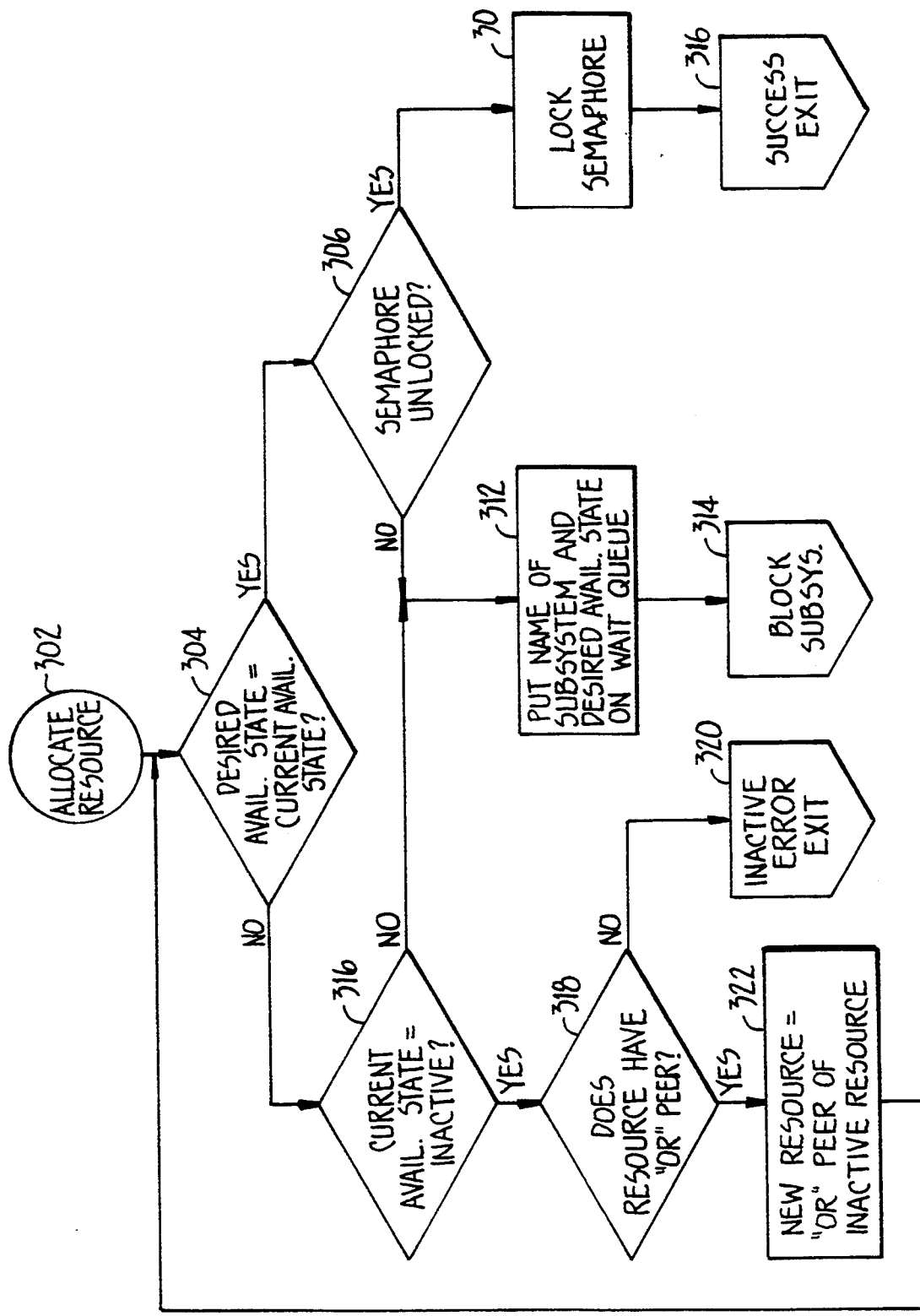
FIG._3.

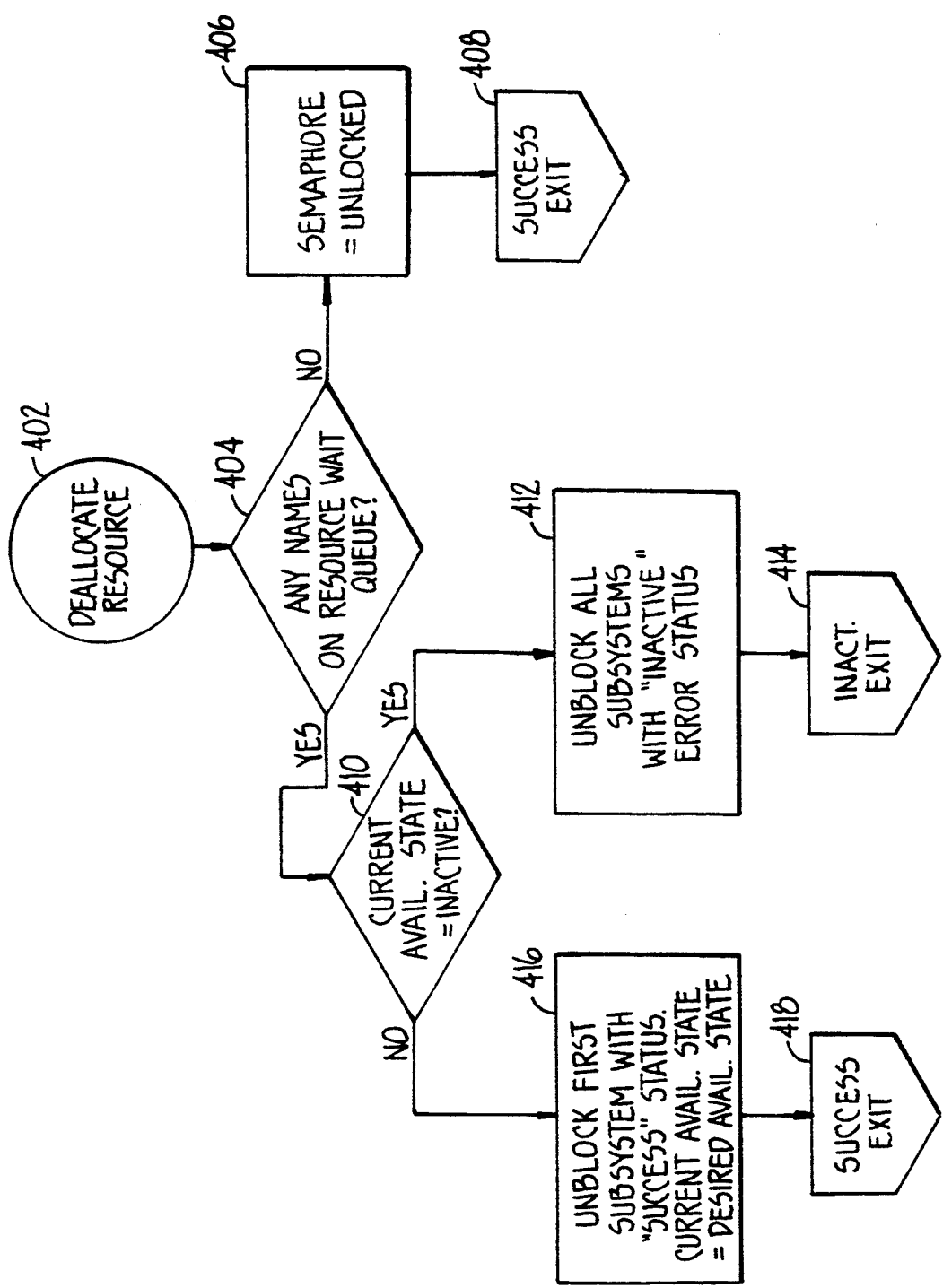
FIG._4.

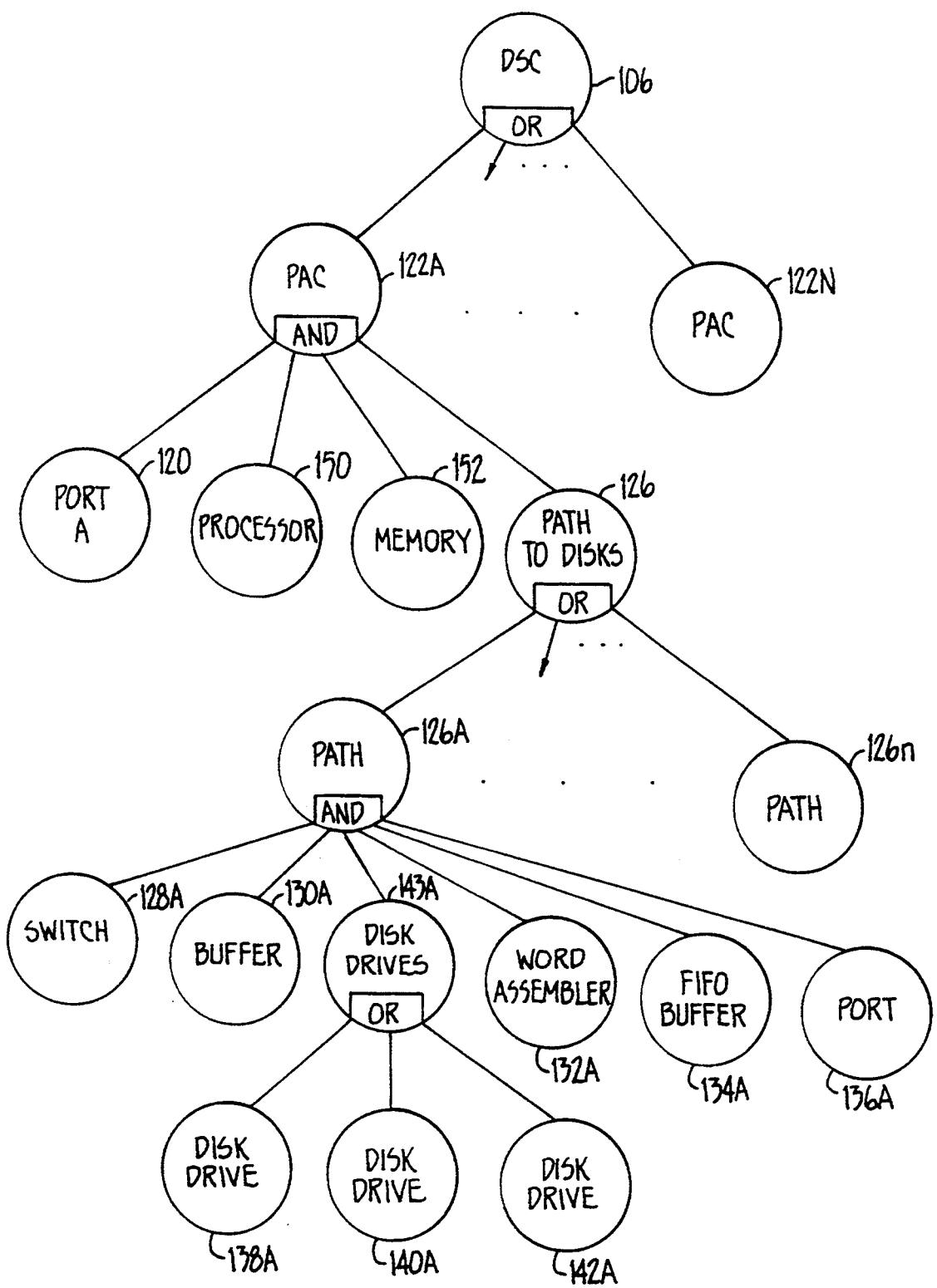
FIG._5.

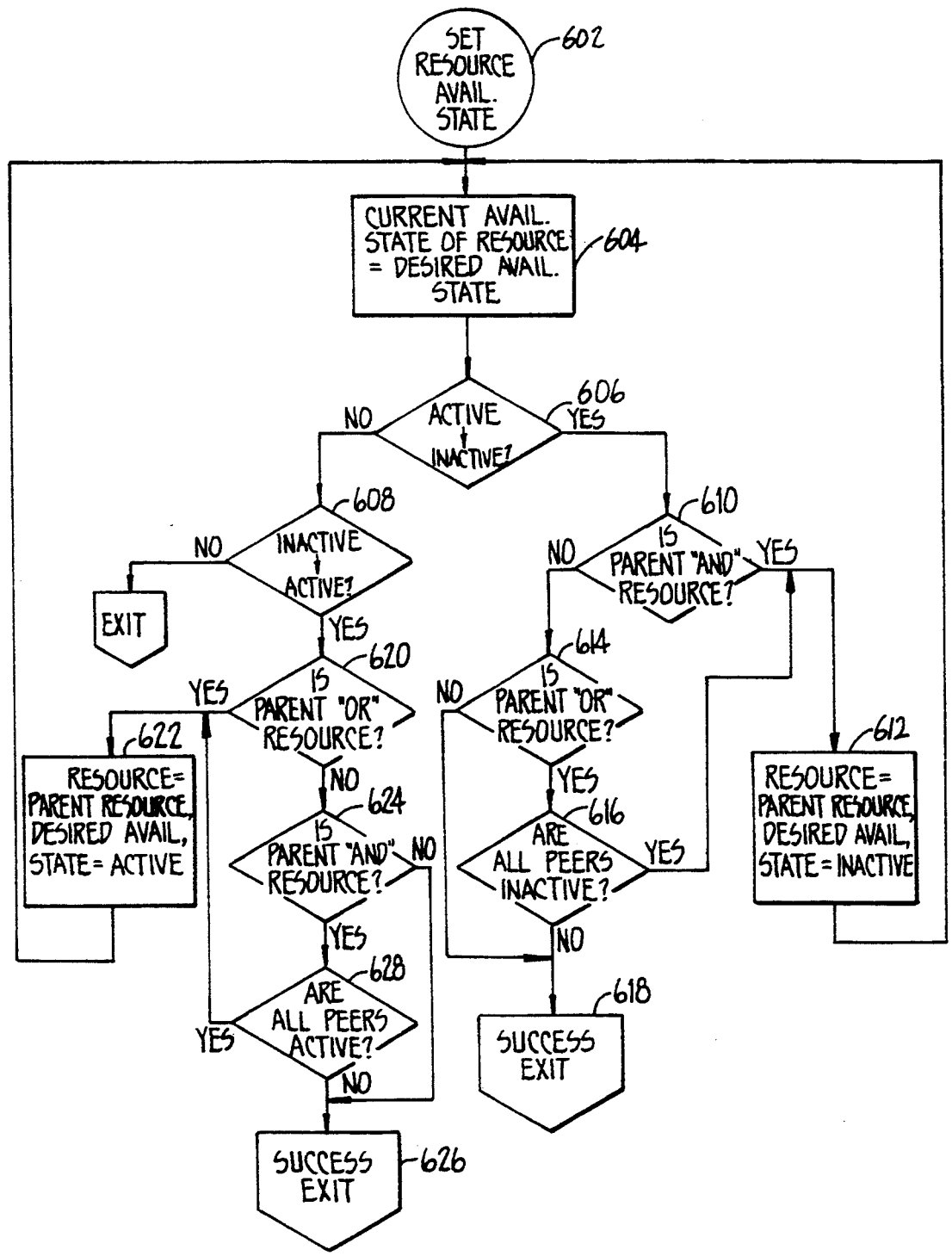
FIG._6.

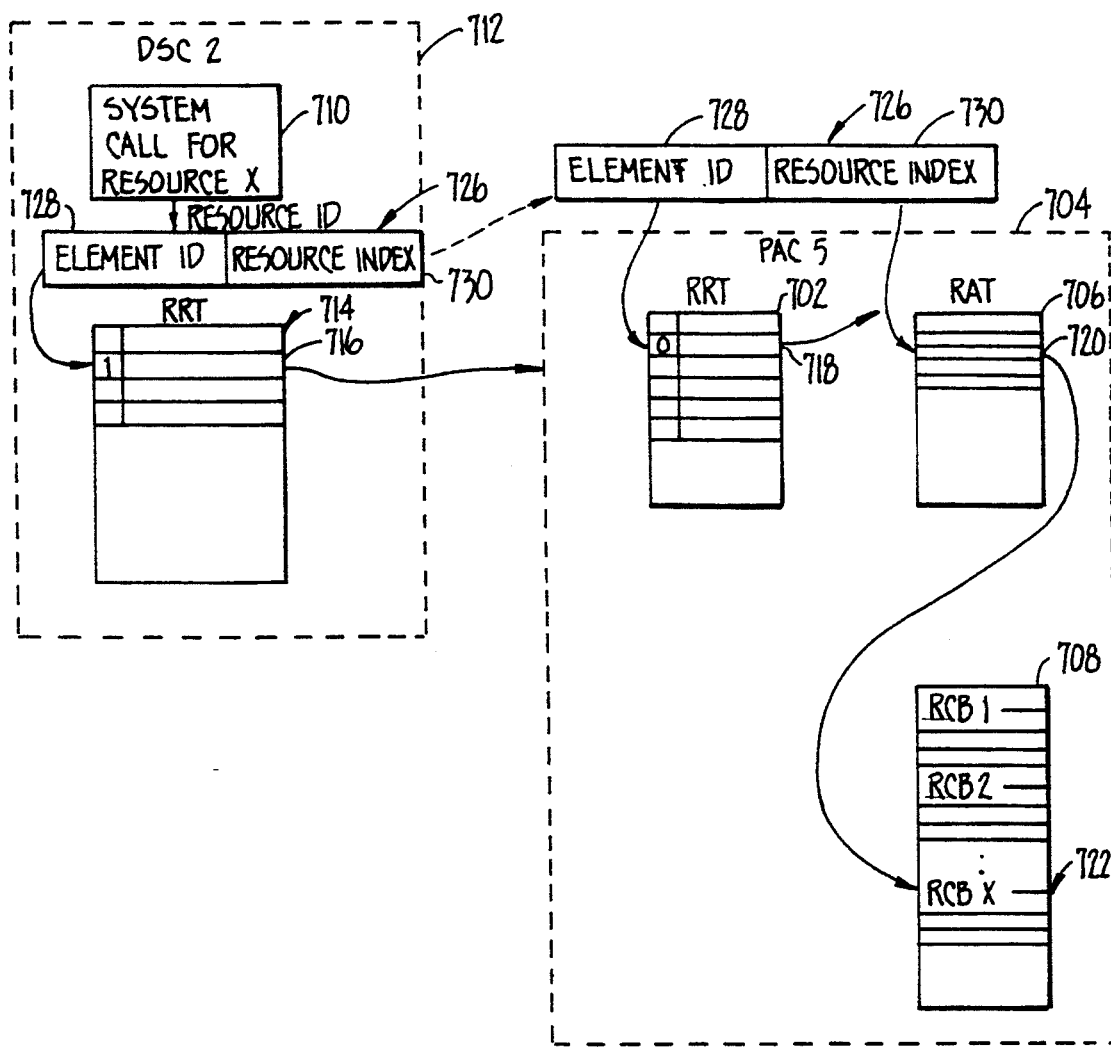
FIG._7.
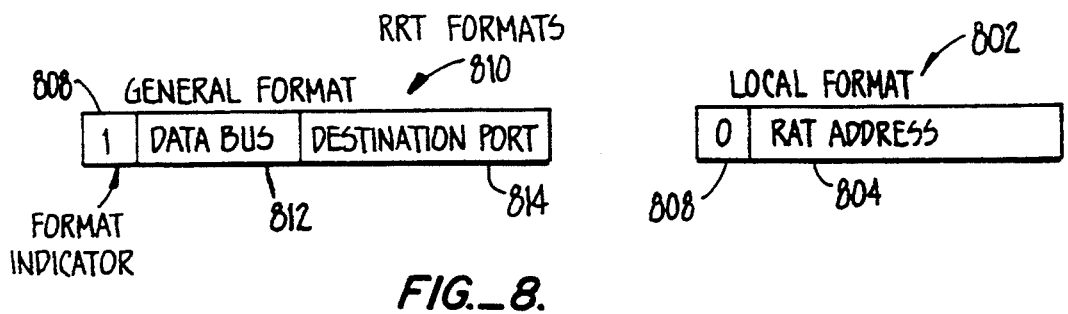
FIG._8.

RESOURCE MANAGEMENT IN A MULTIPLE RESOURCE SYSTEM WHERE EACH RESOURCE INCLUDES AN AVAILABILITY STATE STORED IN A MEMORY OF THE RESOURCE

This is a continuation of application Ser. No. 07/505,854 filed Apr. 6, 1990, now U.S. Pat. No. 5,214,778.

BACKGROUND OF THE INVENTION

This invention relates generally to a computing system for allocating resources in a multiple resource arrangement and, in particular, to a system for allocating resources in a data storage system.

A computing system may be conceptually divided into two general classes of subsystems: (1) the operational subsystems that use system resources to provide the functions the computing system is designed to perform; and (2) the fault management subsystem or subsystems (hat find, analyze, diagnose and, in some instances, take action to minimize the effect of malfunctioning resources on the overall system. The term "resources" is used herein to describe functional modules within the computing system that may be tested separately or used separately for, e.g., storing, transmitting or manipulating data within the system. Resources are hardware elements and include disk drives, processors, memories, data paths, etc. The operational subsystems and the fault management subsystems compete for access to the system resources.

In prior art computing systems, built-in diagnostic routines in the fault management subsystem may gain exclusive access to a resource for relatively long periods of time in order to test the resource. While the diagnostic routine is running on a particular resource, an operational subsystem may request access to that resource in order to perform a resource operation and to provide services to the computing system. In most computing systems, if the operational subsystem receives no reply to its request within a predetermined period of time, the service routine being performed by the operational subsystem may abort, thereby disrupting service to the computing system. What is needed, therefore, is a computing system that manages access to the resources so that the operation of the fault management subsystems do not cause any interruption of the services provided by the operational subsystems.

In conventional computing systems, the system may become partially inoperable if a resource (such as a data storage module or a data path) fails. What is needed, therefore, is a computing system that can compensate for the failure of a resource to keep the system fully operational.

A significant problem with some prior art storage systems is their use of CPU time on the external computer or computers to identify and diagnose inoperative or malfunctioning storage devices within the storage system and to reroute data paths when one or more data storage devices or other peripherals become inoperable. The use of the external computer to perform these low level functions could interfere with more important CPU tasks.

SUMMARY OF THE INVENTION

Our invention addresses these problems in a computing system having (a) a plurality of resources for storing, transmitting or manipulating data, (b) a fault management subsystem and (c) an operational subsystem. A structure is provided for allowing real time sharing of any of the resources between the fault management subsystem and the operational subsystem without disrupting the services provided by the operational subsystem. Each resource has a unique system-wide name enabling it to be addressed with equal ease by the operational and fault management subsystems. Each resource has an availability state associated with it to indicate when one of the subsystems can use it. The same software system calls are used by each subsystem to access a resource giving a uniform method of distributed access.

The computing system of our invention also provides a mechanism for representing the operational interdependencies of the resources by organizing the resources in a logical structure in which each resource is a node conceptually related to at least one other resource. Access to the representation of the system is distributed throughout the system, allowing local determination of faults and local rerouting of data flow transparent to an external computer. A data structure for each node indicates its location in a hierarchial tree along with an indication of whether there is a logical AND or logical OR relationship between it and any other peer resources to which it is related.

The preferred embodiment of the invention is described below with reference to the drawings.

BRIEF DESCRIPTION OF THE DRAWINGS

FIG. 1 is a key for the interconnection of FIGS. 1A and 1B. FIGS. 1A and 1B are a block diagram of a preferred embodiment of a data storage system in which the present invention will operate;

FIG. 2 is a diagram of the contents of an RCB (resource control block) data structure describing a resource of FIG. 1;

FIG. 3 is a flowchart of one embodiment of a system call for allocating a resource according to the present invention;

FIG. 4 is a flowchart of one embodiment of a system call for de-allocating a resource according to the present invention;

FIG. 5 is a diagram illustrating one embodiment of a resource hierarchy according to the present invention;

FIG. 6 is a flowchart of one embodiment of system call for resetting the availability state of a resource according to the present invention;

FIG. 7 is a diagram of a preferred embodiment of a routing structure according to the present invention; and FIG. 8 is a diagram of preferred embodiment of both general and local formats for the RRT (resource routing table) of FIG. 7.

DETAILED DESCRIPTION OF THE PREFERRED EMBODIMENT

I. One Preferred Data Storage System

The preferred embodiment of this invention will be described with reference to a data storage system. It should be understood, however, that the invention may be applied generally to other computing systems.

FIG. 1 shows a pair of data buses 102 and 104 for connecting to an external computer. Data bus 102 couples to a dynamic storage controller (DSC) 106, while bus 104 couples to a DSC 108. The data path through a DSC is shown for DSC 106. The data on bus 102 passes through a port 110, a packet staging memory 112, and another port 114. The data can pass in both directions. A local processor 116, with its associated local memory 118, controls the operation of DSC 106.

Port 114 of DSC 106 is coupled to one of a plurality of PACs (parallel array controllers) 122A-122N. Similarly, DSC 108 is also coupled to all of the same PACs through another bus. DSC 106 is coupled to a port 120 of a particular PAC 122A, while DSC 108 is coupled to a port 124. Each of ports 120 and 124 are coupled to a plurality of data paths 126A-126M. Data path 126A includes a switch 128A (for coupling to one of ports 120 and 124), followed by a buffer 130A, a word assembler 132A (for converting between 32 bit bus 131A and 9 bit bus 133A), a FIFO buffer 134A and a port 136A. The other data paths have similar elements.

Each port is coupled to a group of disk drives. Port 136A is coupled to 3 disk drives, 138A, 140A, and 142A through switches 137A, 139A, and 141A, respectively. The switches allow a separate PAC 122B to also connect to the same disk drives for redundancy. Similarly, bus 144A from PAC 122A couples to a switch for disk drives connected to PAC 122B.

The software for the data storage system of FIG. 1 can be divided logically into two different classes of subsystems: operational subsystems and fault management subsystems. The operational subsystems are distributed throughout the system of FIG. 1 and service the external computer(s) by accessing and operating the disk drives and data paths in response to READ, WRITE and similar requests from the external computer(s).

The fault management subsystems are also distributed throughout the system of FIG. 1. For example, the fault management subsystems that test the individual disk drives are located in the PACs 122A-122N in FIG. 1 in the form of programs in, for example, local memory 152 of PAC 122A which are run by processor 150.

The fault management subsystems perform at least four functions. First, the fault management subsystems run diagnostic software to isolate potentially malfunctioning resources and to test the functioning of the individual resources. The diagnostic tests may be run in response to a specific event, such as a parity check failure, or according to a predetermined schedule. One example of a diagnostic test is a test of portions of buffer memory 130A in PAC 122A performed by a diagnostic subsystem executing on processor 150.

Second, if a diagnostic test indicates that a particular resource is no longer functioning, the fault management subsystems can deactivate the resource. For example, if the diagnostic were to indicate that the above-mentioned buffer memory had failed, the fault management subsystem would deactivate the buffer memory so that future operational subsystem requests for that buffer memory would be declined.

The deactivation and removal of a resource from the computing system will have some effect on the operation of the entire system. The third function of the fault management subsystem is therefore to determine that effect and to initiate appropriate responses.

Finally, a new disk drive or other resource may be added to alter the configuration of the computing system. The fourth function of the fault management system is therefore to determine the effect on the entire system of adding a new resource.

II. Resource Sharing

A. RCB Description.

Because the operational and fault management subsystems cannot simultaneously access a given resource, there must be some mechanisms for controlling access to the resource. In the preferred embodiment of this invention, these mechanisms are the resource control block (RCB) and the system calls which access them, as described below.

In the preferred embodiment of this invention, resources are grouped into functional groups called "elements". Each element consists of a group of resources and a processor which performs the control functions for its member resources. For example, PAC 122A is an element, as is DSC 106.

The structure of an RCB 200 is shown in FIG. 2. RCB 200 is a software structure in the local element memory (i.e., memory 118, 152) that contains information regarding a resource. Each resource has its own RCB. The structure of the RCB differs for each kind of resource. All RCBs, however, have certain common components, as shown in FIG. 2: (1) an identifier or name 201 of the resource or RCB; (2) a field 203 indicating the availability state of the resource; and (3) a semaphore 202 (e.g., a one bit toggle) for locking or unlocking the resource.

1. Resource Naming

Each resource in the system has a unique name, the resource ID, to permit the operational and fault management subsystems to access the RCB and thereby monitor or control the resource. RCBs can be resident in the local address space of any element within the system. Because the name is unique within the system, system calls can access the RCB anywhere in the system, and the RCB does not have to be in the same address space as the subsystem making the system call. If the named RCB is within the local address space of the system making the system call, the RCB is operated on directly. If the named RCB is not in the local address space, a message is sent to the element containing the RCB, the RCB is operated on by the analogous system call in that element, and a return message is sent to signal completion of the operation.

2. Resource Availability State

A resource may have one or more availability states. The availability states include: INACTIVE (resource available only to diagnostics or to the initializing subsystem); TEST (resource available only to diagnostics); ACTIVE (resource available to operational subsystems); and FORCED INACTIVE (the resource is defective and may not be initialized or used by operational subsystems).

The resource availability state controls access to the resource. For example, in response to an operational subsystem request for a particular drive 138A of FIG. 1, if the resource availability state is ACTIVE, the resource controller (processor 150) changes the semaphore 202 of the RCB 200 associated with that drive to "in use" thereby allocating the resource, and performs the requested task. After the task has been completed, the controller changes the RCB semaphore 202 to "available" thereby de-allocating the resource, to permit the next subsystem to access that resource.

If, upon a request for a particular drive, the RCB for that drive indicates that the drive is being tested by system diagnostics (i.e., the RCB availability state is TEST), the name of the operational subsystem requesting the resource is placed in a wait queue maintained in the RCB. FIG. 2 shows an RCB field 208 which points to the head of a wait queue 220. The head of the wait queue is an entry for the next subsystem on the wait queue, i.e., the subsystem which has been waiting the longest. The wait queue entry includes a pointer (221) to the next wait queue member, the name (222) of the subsystem, and the desired availability state (223) of the resource. A field 209 in the RCB contains a pointer to the entry at the tail end of the wait queue.

Since the external computer and/or operational subsystem software routines might be affected if READ and WRITE requests for the disk drives are not responded to within a predetermined time (the "timeout period"), the fault management system diagnostics are designed to complete their routines in period substantially shorter than the timeout period. In other words, the timeout periods for the requests the operational subsystems are serving are determined on an individual basis, and these periods are programmed into the diagnostic and operational subroutines. Thus, by maintaining the name of the operational subsystem in a wait queue and by keeping the diagnostics' access time below the timeout period, the computing system of this invention provides real time sharing of the resource between the operational subsystems and the fault management subsystems.

If a resource's availability state is INACTIVE or FORCED INACTIVE, the operational subsystem cannot access the resource to perform the requested service to the computing system. In the preferred embodiment of this invention, the information model of the system is used to determine the impact of the inactive resource upon the rest of the system. This information model of the computing system architecture represents the operational interdependencies of the resources and permits the fault management subsystem to determine the effect on the entire system of a change in state of a single resource.

3. Semaphore

The semaphore is a variable which is set by whatever portion of the system is using the resource to prevent anyone else from using the resource. The semaphore indicates simply that the resource is in use, while the availability state gives further information on the type of use.

B. System Calls for Resource Sharing

Before using a resource, a subsystem issues the system call "allocate resource" (302) diagrammed with a flowchart in FIG. 3. In this system call, the desired availability state for the resource is first compared (304) to the current availability state of the resource in field 303 of the RCB as illustrated in FIG. 2. If the states are equal, the semaphore is next checked to see if it is locked (306). If it is unlocked, the semaphore is locked (308) and there is a successful exit from the system call (310).

If the semaphore was locked, the name of the subsystem making the call and its desired availability state are placed on a wait queue (312). A message is then returned to the subsystem indicating that it is temporarily blocked from using the resource (314).

If the desired availability state did not equal the current availability state (304), the current availability state is checked to see if it is inactive (316). If it is not inactive, the subsystem name and desired availability state are placed on the wait queue (312). If the current availability state is inactive, the resource is checked to see if it has an OR peer. An OR peer, as will be described further below, is an equivalent resource in an equivalent position in the system. If there is no OR peer, an error message is returned to the subsystem indicating that the resource is inactive (320). If there is an OR peer, that OR peer is designated as the new name for the resource which was inactive (322) and the process is repeated for the new resource starting at the step of comparing the desired availability state with the current availability state of the new resource (304). This process allows the OR peer to handle the requested operation transparent to the system making the call.

FIG. 4 is a flowchart of the system call "de-allocate resource" (402) which is used when a subsystem no longer has a need for the resource and desires to free it up for use by other subsystems. A check is first done to see if there are any names on the resource wait queue (404). If there are not, the semaphore is unlocked (406) and there is a successful exit (408) from the system call.

If there are names on the wait queue, the current availability state is checked to see if it is inactive (410). If it is inactive, all the waiting subsystems are unblocked with an inactive error status message returned to them (412) and there is an inactive error exit from the system call (414). This lets the waiting subsystems know the resource is no longer active. If the current availability state is not inactive, the first subsystem in the wait queue is unblocked with a "success" status message. The current availability state is also set to the desired availability state (416) and there is a successful exit (418) from the system call. The resource is now allocated to the subsystem that has been waiting in the queue the longest time.

II. Resource Information Model

A. General Description

In one embodiment of this invention, the fault management subsystem organizes the resources in a logical hierarchy. Simple resources are at the bottom of the hierarchy, and the top node of the hierarchy is the system compound resource. The hierarchy shows the conceptual interrelationship and interdependencies of the resources.

The collection of resources into control hierarchies accomplishes several goals. First, initializing, diagnostic and functional software users can share resources in a manner that is transparent to the host computer(s). Second, the impact of a resource availability state change to the operation of the system as a whole can be easily determined by reference to the hierarchial relationship. Finally, if a resource does change state, an alternative resource may be located within the hierarchy to complete the requested software operation.

1. Parent, Child and Peer Resources

The resources conceptually connected to a node in the hierarchy above the node of the resource are that node's "parent resources," and the resources conceptually connected below the resource's node are that node's "child resources." Each resource may also have one or more "peer resources," indicating that the resource is one of a set making up a compound resource. The RCB (see FIG. 2) has a set of pointers indicating its location in the resource hierarchy. The pointers give the address of any parent resource (204), any child resources (206) and any peer resources (205).

2. Resource Type

A collection of resources may also be considered to be a resource. For example, a data path through a printed circuit board may be composed of multiple hardware modules that work together to cause the data to be moved from one interface to another interface. Such a resource would be considered COMPOUND rather than SIMPLE. Another example would be PAC 122A discussed above. Field 207 (see FIG. 2) of the RCB indicates whether it is a compound or simple resource.

Each compound resource is a collection of resources related according to some function, such as an OR collection or an AND collection of lower level resources. Other possible functions include a minimum number of peers or a special peer which must always be present. Accordingly, it will be understood that the references herein to OR and AND functions could be any other function as well. The resources which are part of a collection of resources may themselves be either simple or compound. The OR/AND relationship is also indicated in field 207. An OR relationship between a compound resource and its associated child resources implies that a user can use the compound resource if any of its associated resources are in a state which allows usage. For example, if there are two disk drives which are interchangeable in their operation, and either of them may be chosen for use, an OR compound resource is created consisting of the OR combination of the two simple resources. For example, PAC 122A is an element as is DSC 106.

Likewise, an AND relationship between a compound resource and its associated child resources implies that a user can use the compound resource only if all of the associated child resources are in a state permitting usage. For example, if a data path in a printed circuit board consists of three hardware modules, and all hardware modules must be operational to allow the data path to be operational, a compound parent resource is created consisting of the AND combination of the three simple hardware resources.

3. Hierarchial Tree

FIG. 5 is a diagram of a portion of a hierarchial tree representing the system of FIG. 1. DSC 106 is represented as the top of the tree. Below it are child resources in an OR relationship. These child resources are PACs 122A-122N. The PACs are peers of each other and have DSC 106 as the parent. PAC 122A is composed of an AND relationship of port 120, processor 150, memory 152 and data path 126. This is an AND relationship because all of these elements are required for PAC 122A to work. The PACs are in an OR relationship with each other because any one of the PACs can be used to provide a path to a disk array.

Any one of data paths 126 can be used, and thus data paths 126A-126M are in an OR relationship. Path 126A is formed of an AND relationship of switch 128A, buffer 130A, word assembler 132A, FIFO buffer 134A, port 136A and disk drives 143A. Disk drive group 143A is composed of individual disk drives 138A, 140A and 142A.

4. Rerouting

As shown in the flowchart of FIG. 3, the system of this invention uses the hierarchial information stored in the RCBs to reroute data paths if a resource should become unavailable. In response to an operational subsystem request for allocation of resource X, the local element finds and accesses $RCB_x$ as discussed above and reads the availability state of resource X. If the state is ACTIVE, the system call allocates the resource by setting the semaphore to "in use". If the state is TEST, the system call adds the name of the operational subsystem to the $RCB_x$ wait queue, as discussed above. After completion of the diagnostic, the system call sets the semaphore to "available" takes the operational subsystem name off the wait queue and allocates the resource to that operational subsystem.

If the $RCB_x$ availability state reads INACTIVE, the allocation system call looks further in the RCB to determine if there is a peer which may be used to perform the requested operation in the place of resource X. If there is such a peer resource, the system call allocates that resource and notifies the operational subsystem of the change. System requests for resource X should thereafter access the peer resource. If there is no replacement peer resource, the allocation request will end in error.

5. Resource Routing Table

As diagrammed in FIG. 7, each element processor maintains an RCB routing table (RRT) 702 in its local memory 704 containing information regarding where each resource control block in the system is located. Each element also maintains an RCB address table (RAT) 706, which is a listing of pointers to the RCBs 708 for each resource within the element. The RRT entry will have one of two possible formats. The local address format 802 of FIG. 8 is for resources within the element in question. The RRT entry is a pointer 804 to the base of the element resource address table (RAT) 706. A format indicator 808 is set to zero to indicate the local address format.

The general format 810 is used to identify system resources outside the element in question. In the general format 810, the local RRT entry points toward an element elsewhere in the system where the RCB is located and is in two parts. (1) the identity of the data bus 812 leading from the element in question to the next element; and (2) the location 814 of the element on the data bus. A format indicator 808 is set to "1" to indicate the general format 810. The RRT entries in each element continue to point to further elements until reaching an RRT entry for that resource in the local address format.

The use of the RRTs, RATs and RCBs is depicted schematically in FIG. 7 which traces a system call 710 for resource X. Software within an operational subsystem 712 identifies resource X as the resource needed to fulfill a request by the external computer. The name for resource X is its resource ID 726. this is composed of an element ID 728 and a resource index 730. The RRT 714 in the element containing the operational subsystem 712 (located within subsystem local memory) has an entry 716 corresponding to resource X. The element ID 726 is used to index to the location 716 for resource X in RRT 714. The format indicator of the entry is "1" indicating that the entry is in the general format. The entry is therefore in two parts: (1) the identity of the data bus connecting the element containing the operational subsystem with the element containing resource X; and (2) the location of the data bus port at which that element is located. The operational subsystem passes a message containing the system call information (including resource ID 762) to the element identified in the RRT, and a resource management subsystem within the element looks to its RRT 702 to determine the location of resource X. Again, element ID 728 of the passed resource ID 726 is used to index to a location 718 for resource X in RRT 702.

As shown in FIG. 7, the format indicator in the entry 718 for resource X in RRT 702 is a "0" indicating that the RCB for resource X is in local element memory 704. The entry 718 corresponding to element X in RRT 702 is therefore simply the local memory address of the beginning of RAT 706 in element memory 704. Resource index 730 is used to find a location 720 in RAT 706 which is an address pointing to the location 722 of the RCB for resource X.

As discussed above, the entries in the RCBs contain information regarding the resource availability state and pointers to parent, child and peer resources.

6. System Call for Setting Availability State

If a resource becomes available, or if it becomes unavailable, the effect on its parent resource must be determined. For instance, if the resource is in an AND relationship with another resource through its parent, and becomes inactive, the parent must be set to inactive since it cannot operate without both resources of the AND relationship.

FIG. 6 is a flowchart of a system call 602 for setting resource availability state. It is expected that this system call is only made by a subsystem which currently has the resource allocated. The current availability state of the resource is set to be equal to the desired availability state (604). This setting step is then checked to see if it caused the availability state to transition from active to inactive (606) or from inactive to active (608).

If the transition is from active to inactive, a check is done to see if there is a parent AND resource (610). If there is, the resource is set to be the parent resource, the desired availability state is set to inactive, and the process is repeated at state 604 for the parent resource.

If there is not a parent AND resource, a check is done to see if there is a parent OR resource (614). If the parent is composed of a number of OR resources, a check is done to see if all the peers are inactive (616). If not all of the peers are inactive, then the parent is still operable since it only needs one element of the OR peers to work, and a successful exit from the system call is made (618). Similarly, if the parent resource is not an OR resource (and it was previously determined that it was also not an AND resource), then a successful exit is made from the program as well. If all of the peers of a parent OR are inactive, the parent must be inactivated, and the system call moves to step 612.

If the transition was from inactive to active (608) a check is done to see if the parent is an OR resource (620). If it is, a single active child is enough to activate the parent, and the resource is set to the parent resource with the desired availability state being set to active (622) and the process is repeated for the parent resource starting at step 604. If the parent is not an OR resource, a check is done to see if the parent is an AND resource (624). If it is not, that means that there is no effect on other resources. Thus, a successful exit 626 is made from the system call. If there is an AND relationship, a check is done to see if all peers are active. If they are not, the parent cannot be changed to active, and the program is exited (626). If all the peers are active, the parent can be set to active, and step 622 is entered.

7. Example of Use of the System

A specific example of the fault management system's use of the RCB information model can be explained with reference to FIG. 1. Assume the external computer has called for a WRITE to a disk 138A. DSC 106 identifies the request by the external computer as meant for a drive 138A in group 143A of PAC 122A. Once in PAC 122A, the operational subsystem identifies the resources needed to perform the write request and makes system calls to allocate those resources. If the resources are in the ACTIVE availability state, the operational subsystem performs the requested WRITE operation, returns the appropriate response upward through the hierarchy to the external computer, and de-allocates the resources through system calls.

If the drive RCB availability state is TEST, the system call places the name of the PAC operational subsystem in the wait queue of the RCB. When the RCB availability state changes from TEST to ACTIVE, the resource is allocated to the operational subsystem, and the write operation is performed.

If the drive RCB availability state is INACTIVE, the system call looks in the RCB information model to see if another disk drive may be used instead. If such a drive resource exists, that resource is allocated and used. If not, the command is aborted.

A fault management subsystem may attempt to allocate disk 138A while it is being used by the operational subsystem. It will find that the semaphore is set to "in use" and it will go into the wait queue 220 of FIG. 2. Once the operational subsystem is done, it will de-allocate disk 138A through the procedure of FIG. 4. The resource is allocated to the fault management subsystem as the next name in line on the wait queue, and the availability state is set to test. At this point, it should be noted that any parent resources will not change availability states as the resource is transitioning to the test state (unlike a transition to the inactive state).

When the fault management subsystem is finished, it will de-allocate the disk drive. If, during the fault management operation, the operational subsystem attempts to allocate disk 138A again, it will see that disk 138A is in use and set to a test state. It's name and other information will then be placed on the resource wait queue.

During the time that the resource is allocated, the fault management subsystem may set the availability state of the resource to "forced inactive". In this case, when the fault management subsystem de-allocates the resource, the waiting subsystem is told the resource is inactive. It would then attempt to allocate a peer resource.

The distributed data storage system described above is but one embodiment of this invention. Other embodiments will be apparent to those skilled in the art.

For example, the DSCs of FIG. 1 could be directly coupled to the disk group 143A without the intervening PAC. As will be understood by those familiar with the art, the present invention may be embodied in other specific forms without departing from the spirit or essential characteristics thereof. Accordingly, the disclosure of the preferred embodiment of the invention is intended to be illustrative, but not limiting, of the scope of the invention which is set forth in the following claims.

What is claimed is:

1. A method for determining the availability of resources in a computing subsystem coupled to a host computer, each resource having an availability state, comprising the steps of:

storing information in a memory coupled to one of said resources regarding the operational relationship between said one resource and at least one other resource in the computing subsystem;

determining whether a resource is operable;

changing the availability state of a resource in response to a determination of a fault management subsystem that a resource is inoperable; and determining, internally to each resource, how a change in the availability state of a resource affects the availability of other resources in the computing subsystem.

2. A method for allocating resources in a computing subsystem coupled to a host computer comprising the steps of:

providing a plurality of resources for storing, transmitting or manipulating data, each resource having an availability state stored in a memory in said resource;

accessing and operating resources that are in a first availability state with a fault management subsystem;

providing services to the host computer with an operational subsystem, distributed throughout said computing subsystem, by generating a plurality of resource requests in response to a host request from said host computer, said host request having a time-out period;

accessing and operating resources that are in a second availability state with said operational subsystem; and controlling access to an individual resource by the fault management subsystem and the operational subsystem, including changing the availability state of a resource from the second state to the first state to permit the fault management subsystem to gain access to the resource and holding a request for access to said resource from said operational subsystem for less than said time-out period and causing said fault management subsystem to complete its access of said resource in less than said time-out period.

3. A computing system for coupling to a host computer comprising:

a plurality of resources for storing, transmitting or manipulating data, each resource having an availability state stored in a memory in said resource;

a fault management subsystem having means for accessing and operating resources that are in a first availability state;

an operational subsystem, distributed throughout said computing system, for providing services to the host computer, the operational subsystem generating a plurality of resource requests in response to a host request from said host computer, said host request having a time-out period;

said operational subsystem having means for accessing and operating resources that are in a second availability state;

means for controlling access to an individual resource by the fault management subsystem and the operational subsystem, including means for changing the availability state of a resource from the second state to the first state to permit the fault management subsystem to gain access to the resource and holding a request for access to said resource from said operational subsystem for less than said time-out period and means for causing said fault management subsystem to complete its access of said resource in less than said time-out period.

4. The computing system of claim 3 wherein the fault management subsystem further comprises means for determining whether a resource is operable, and wherein the means for controlling access further comprises means for changing the availability state of the resource in response to said means for determining that a resource is inoperable.

5. The computing system of claim 3 wherein the means for controlling access comprises memory means for storing information regarding each resource's availability state.

6. The computing system of claim 5 wherein the means for controlling access further comprises means for controlling access to a resource by the fault management subsystem and the operational subsystem using the information regarding the resource availability state stored in the memory means.

7. A data storage subsystem for connecting to a main central processing unit, comprising:

at least one element, said element having a local processor, a memory, and a plurality of resources, said resources forming part of a data storage path for connecting to said main central processing unit;

a plurality of resource control blocks in said memory, each of said resources having one of said resource control blocks associated with it;

each of said resource control blocks having an availability entry and means for causing a request for a resource to wait;

an operating subsystem, distributed throughout said data storage subsystem, for providing data to and from said main central processing unit;

a diagnostic system coupled to said element; and means for providing real time sharing of said resources between said diagnostic system and said main central processing unit by putting a test indication in said availability entry during access of the resource by said diagnostic system and putting a request for said resource from said operating subsystem in said means for causing a request for a resource to wait, until said diagnostic system is finished with said resource, then changing said availability state and returning a resource available signal to said operating subsystem, or determining the existence of and assigning an equivalent resource in response to said operating subsystem request.

8. The data storage subsystem of claim 7 wherein said operating subsystem includes a first program in said memory run by said local processor and said diagnostic system includes a second program in said memory run by said local processor.

9. The data storage subsystem of claim 8 further comprising a plurality of disk drives and a plurality of said elements, at least two of said elements comprising data routing systems coupled between said main central processing unit and a plurality of said disk drives.

10. A computing system for coupling to a host computer comprising:

a plurality of resources for storing, transmitting or manipulating data, each resource having an availability state;

a fault management subsystem having means for accessing and operating resources that are in a first availability state;

an operational subsystem for providing services to the host computer, the operational subsystem generating a plurality of resource requests in response to a host request from said host computer, said host request having a time-out period;

said operational subsystem having means for accessing and operating resources that are in a second availability state;

means for controlling access to an individual resource by the fault management subsystem and the operational subsystem, including means for changing the availability state of a resource from the second state to the first state to permit the fault management subsystem to gain access to the resource and selectively either holding a request for access to said resource from said operational subsystem for less than said time-out period or redirecting said request for access to a redundant resource.

* * * * *